US010268969B2

(12) United States Patent
Snoddy et al.

(10) Patent No.: US 10,268,969 B2
(45) Date of Patent: Apr. 23, 2019

(54) ARTIFICIAL INTELLIGENCE CONTROLLED ENTERTAINMENT PERFORMANCE

(71) Applicant: Disney Enterprises, Inc., Burbank, CA (US)

(72) Inventors: Jon Snoddy, Pasadena, CA (US); Alfredo Ayala, West Covina, CA (US); Daniel Pike, Burbank, CA (US); Mike Fusco, Alhambra, CA (US); Douglas Fidaleo, San Diego, CA (US)

(73) Assignee: Disney Enterprises, Inc., Burbank, CA (US)

( * ) Notice: Subject to any disclaimer, the term of this patent is extended or adjusted under 35 U.S.C. 154(b) by 538 days.

(21) Appl. No.: 14/688,864

(22) Filed: Apr. 16, 2015

(65) Prior Publication Data
US 2016/0303483 A1     Oct. 20, 2016

(51) Int. Cl.
*G06N 5/00*       (2006.01)
*G06N 99/00*     (2019.01)
*G06N 3/00*       (2006.01)
*G06Q 30/00*     (2012.01)
*A63J 5/00*        (2006.01)

(52) U.S. Cl.
CPC ........... *G06N 99/005* (2013.01); *G06N 3/006* (2013.01); *G06Q 30/00* (2013.01); *A63J 2005/001* (2013.01); *G06N 5/00* (2013.01)

(58) Field of Classification Search
USPC .................................................... 706/12, 45
See application file for complete search history.

(56) References Cited

PUBLICATIONS

Ijaz, et al., Enhancing the Believability of Embodied Conversational Agents through Environment-, Self- and Interaction-Awareness, Proceedings of the Thirty-Fourth Australasian Computer Science Conference—vol. 113, 2011, pp. 107-116.*
Ijaz, et al., Enhancing the Believability of Embodied Conversational Agents through Environment-, Self- and Interaction-Awareness, Proceedings of the Thirty-Fourth Australasian Computer Science Conference—vol. 113, 2011, pp. 107-116 (Year: 2011).*

\* cited by examiner

*Primary Examiner* — Wilbert L Starks
(74) *Attorney, Agent, or Firm* — Patent Ingenuity, P.C.; Samuel K. Simpson

(57) ABSTRACT

A process and computer program product to record performance related data for a plurality of entertainment performances having a plurality of audiences. Further, the process and computer program product determine external data that is associated with the plurality of audiences and/or environmental factors corresponding to locations of the plurality of entertainment performances. In addition, the process and computer program product annotate the performance related data with the external data to generate annotated performance related data. The process and computer program product also train an artificial intelligence system based upon the annotated performance related data. The process and computer program product generate, at the artificial intelligence performance instructions to provide a performance. Further, the process and computer program product provide, from the artificial intelligence system to a performance device, the performance instructions to provide a performance.

15 Claims, 6 Drawing Sheets

ARTIFICIAL INTELLIGENCE CONTROLLED ENTERTAINMENT PERFORMANCE

BACKGROUND

1. Field

This disclosure generally relates to the field of artificial intelligence. More particularly, the disclosure relates to an artificial intelligence system utilized for an entertainment performance.

2. General Background

The artificial intelligence area of the field of computer science was developed with the goal of having various computerized devices mimic human behavior. The basis of the artificial intelligence area is the concept of a machine being able to exhibit intelligent behavior that is almost indistinguishable from that of a human. Various computer programs and artificial intelligence techniques have been used to provide intelligent interfaces between the machines and humans or between the machines and other machines. These attempts mostly focus on emulating the logical intelligence of a human being, e.g., answering questions, playing games, retrieving data, etc.

Automated systems are increasingly used in entertainment performances such as theatrical, film, theme parks, concerts, sporting events, lectures and the like. Animatronics, puppets, props, mobile sets, and the like may be operated by a human operator which gives the impression of intelligent interaction to guests because a human is behind the interaction. The previous devices used in entertainment environments were lacking, among other things, the emotional intelligence that occurs in a human to human entertainment experience. For example, a human comedian provides a comedic performance based upon the emotional reactions, e.g., laughing, or lack of emotional reactions, e.g., silence, that the human comedian senses from a human audience. As previous animatronics lacked that emotional intelligence, human operators typically operated the animatronics, e.g., puppeting an animatronic, locally or remotely, while observing the audience so that components of the performance such as content, direction, flow volume, pace, and the like, were based upon the observed emotional reactions of the human audience.

Human operators have limited ability to attend to all that is happening in a performance. When required to operate a device such as a puppet, animatronic, or projected character, some ability to attend to audience reaction is lost. It is not uncommon to have multiple operators for a single puppet, as well as a handler to assist with audience interaction. Even then, operators find it difficult or impossible to pay attention to each individual in the audience and so some audience members may experience a compromised ability to emotionally connect with the performance.

An artificial intelligence system that controls a performance device to provide a performance automatically without the assistance of a human is needed.

SUMMARY

A process and computer program product record performance related data for a plurality of entertainment performances having a plurality of audiences. Further, the process and computer program product determine external data that is associated with the plurality of audiences and/or environmental factors corresponding to locations of the plurality of entertainment performances. The external data may also include information that is indirectly associated with audience members, e.g., weather and traffic information for a person's hometown. In addition, the process and computer program product annotate the performance related data with the external data to generate annotated performance related data. The process and computer program product also train an artificial intelligence system based upon the annotated performance related data. The process and computer program product generate, at the artificial intelligence performance instructions to provide a performance. Further, the process and computer program product provide, from the artificial intelligence system to a performance device, the performance instructions to provide a performance.

A system has a recording device that records performance related data for a plurality of entertainment performances having a plurality of audiences. Further, the system has an annotation device that annotates the performance related data with external data to generate annotated performance related data. The external data is associated with the plurality of audiences and/or environmental factors corresponding to locations of the plurality of entertainment performances. In addition, the system has an artificial intelligence system that is trained based upon the annotated performance related data, that generates performance instructions to provide a performance and that provides the performance instructions to a performance device to provide a performance.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1A:
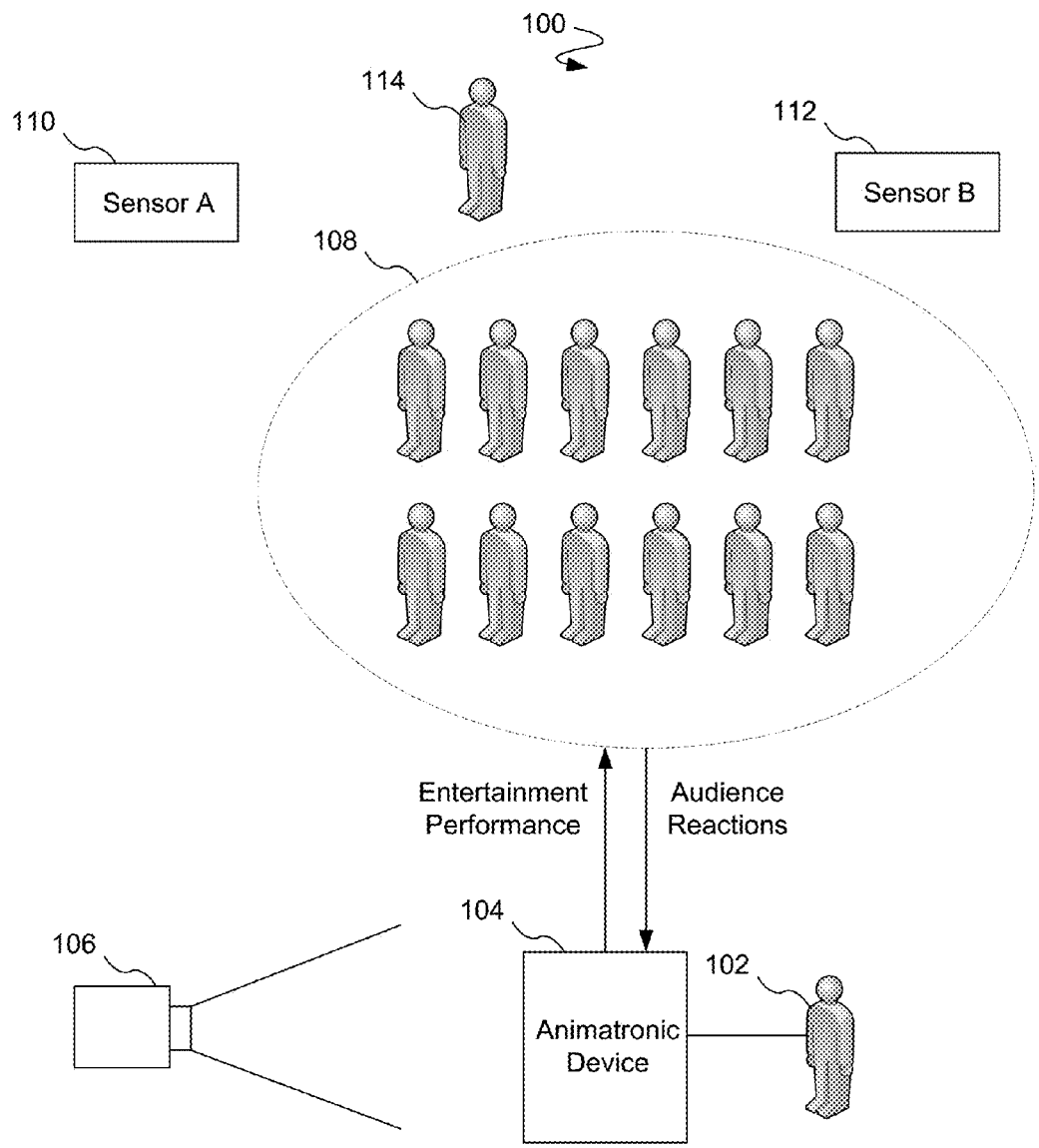
FIG. 1A illustrates a training configuration.

An artificial intelligence system controls a performance device to provide an entertainment performance. The artificial intelligence system is trained according to a combination of performance related data, e.g., performance content, gestures, timing, etc., and external data, i.e., audience interaction, fidgeting, attention, silence, booing, environmental data, etc. The environmental data includes temperature, room size, demographics, etc. The performance related data may be recorded during a performance and then tagged or annotated with metadata describing the external data. The artificial intelligence system uses the training it received to then control a performance device, e.g., an animatronic, a playback device, a sound board operably attached to a set of speakers, a lighting device, etc., to provide a performance in a manner that provides a heightened opportunity for audience members to emotionally connect with the performance device.

For example, a human comedian that provides a performance typically has a set of rehearsed material that is available for use during a performance. During the performance, the comedian rarely performs exactly according to the rehearsed material. Instead, the comedian typically adjusts the performance to the particular audience, e.g., demographic information, geographic location of audience, average age of audience members, etc., and the emotional reactions of that audience as judged from observations such as eye contact, gaze direction, laughter, groans, booing, silence, fidgeting and the like. The comedian typically improvises such adjustments based upon the comedian's experience of previously dealing with a similar audience and reactions from that similar audience. For instance, the comedian may select, improvise, and modify material on stage after determining that the average age of the audience is younger than a typical audience attending the human comedian's show and recalling similar emotional reactions from audiences with similarly aged members. The comedian can remove a joke that was in the rehearsed material, but that did not evoke laughter from the similarly aged previous audience with similar reactions. The comedian can also add a joke that was not in the rehearsed material, but that was a previous improvisation that had evoked laughter from the similarly aged previous audience with similar reactions.

The performance of the human comedian is recorded as performance related data. External data, which is data that is distinct from the performance, is added to the performance related data as an annotation. The annotated performance related data is then used for future training, or possibly real-time training, of the artificial intelligence system. For example, the performance provided by the human comedian may be recorded. That recorded performance is then annotated with a layer of external data, e.g., metadata, tags, etc., having information such as audience interaction (both verbal and non-verbal), whether the audience laughed or applauded, room temperature, demographics, etc. at particular segments of the performance, e.g., a particular time when the human comedian told a particular joke. The external data can be received from audience sensors, e.g., thermometers, sound sensors, etc., or can be manually inputted by a human monitor that views the performance and characterizes the performance based upon criteria particular to that performance, e.g., counting the number of audience members that smiled during a particular joke. The human monitor can generate the metadata in real-time during the performance or after the performance by reviewing the recording of the performance. The external data can also be generated by programs that analyze the recordings of the audience sensors and the recording of the performance. This automated analysis can be performed both in real time and as a post processing pass. The annotated performance related data is then stored in a library that can be used to train the artificial intelligence system to mimic the emotional intelligence of a human performer such as the human comedian. As a result, the trained artificial intelligence system can operate, e.g., via sending commands, a performance device such as an animatronic to mimic the human comedian.

The performance is not limited to a human comedian. Other types of human performers providing performances may also be recorded. Further, the performance is not limited to a performance by a human as the performance of a performance device, e.g., an animatronic, a lighting device, etc., may be recorded.

FIG. 1A illustrates a training configuration 100. The training configuration 100 has a human operator 102, an animatronic device 104, a recording device 106, an audience 108, sensors 110 and 112 that monitor the audience 108 during the performance, and a human monitor 114 that may alternatively or additionally monitor the audience 108 during the performance.

The human operator 102 operates or puppets the animatronic device 104 to provide a performance to the audience 108. The performance has goals and constraints such as telling a particular story, encouraging a number of laughs, completing the performance in a set time window, and the like. The human operator 102 is aware of these goals and constraints, as well as knowing what material or content is available to deliver. In the case of a comedian, the human operator 102 may know dozens of jokes and stories, only a few of which will be presented in any given presentation. The human operator 102 may also use a variety of comedy structures that can be used in an improvisational manner based on observed audience reaction. Certain of those jokes and stories might be designated as mandatory, which forms another constraint on the performance, while others are optional. The human operator 102 modifies the selection of material in a manner consistent with the performance constraints based upon the audience reactions to ensure that the performance constraints are met while at the same time creating a high probability that the entertainment experience is enjoyable and continues to be enjoyable.

The recording device 106, e.g., an image capture device, a sound recording device, etc., is utilized to record the performance, i.e., performance related data. The recording includes any adjustments or lack of adjustments performed by the animatronic 104 via the human operator 102.

The sensors 110 and 112 are used to monitor a variety of external data. For example, the sensor 110 may be a thermometer whereas the sensor 112 may be a sound sensor. Further, a human monitor 114 can view the audience 108 for various audience 108 responsiveness or lack of responsiveness during the performance.

Figure 1B:
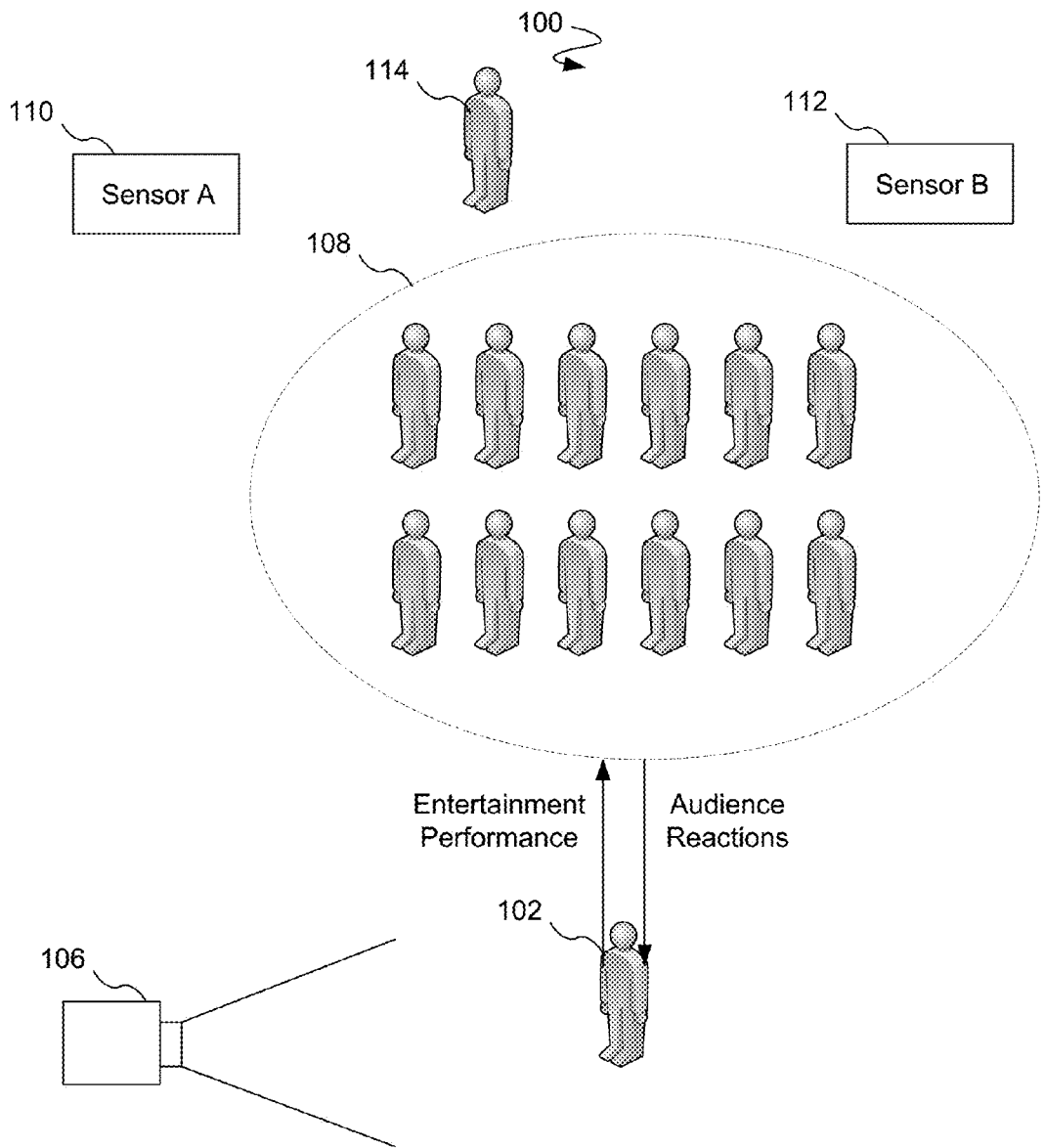
FIG. 1B illustrates the training configuration of FIG. 1A with the human operator providing the entertainment experience without the animatronic device.

In another implementation illustrated in FIG. 1B, the training configuration 100 has the human operator 102 providing the entertainment experience without the animatronic device 104. The recording device 106 records the performance provided by the human operator 102 to the audience 108 and any adjustments or lack of adjustments to performance material based upon reactions of the audience 108.

FIGS. 1A and 1B provide different examples of performances that may be recorded as performance related data for the purpose of training an artificial intelligence system. Various other types of performances with different types of performers and/or performance devices may also be recorded for performance related data and used for training an artificial intelligence system.

Figure 2:
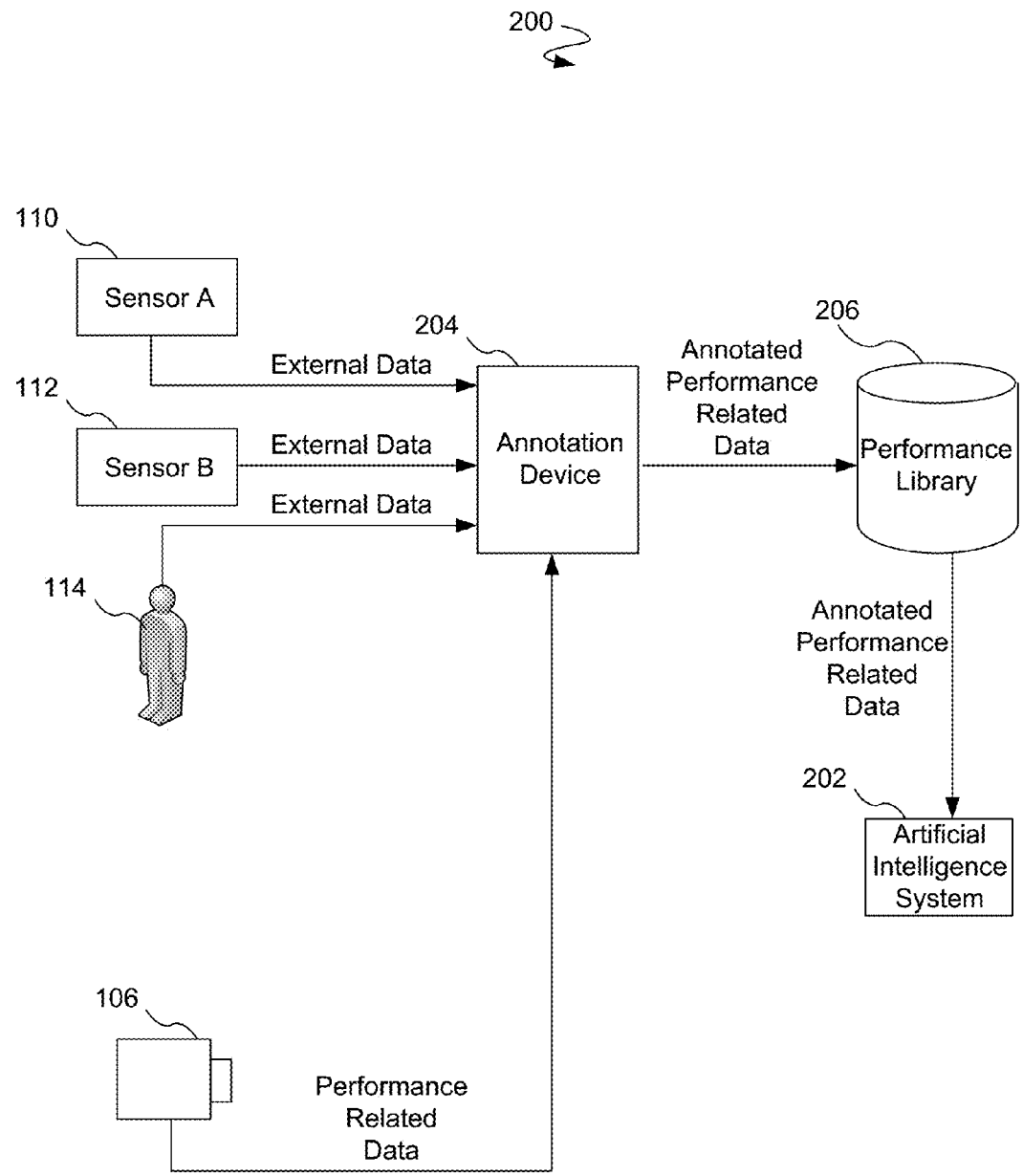
FIG. 2 illustrates an annotation configuration that annotates the performance related data with the external data for use in training an artificial intelligence system.

FIG. 2 illustrates an annotation configuration 200 that annotates the performance related data with the external data for use in training an artificial intelligence system 202. The annotation configuration 200 has an annotation device 204, e.g., a computing device, that receives performance related data from the recording device 106 and external data from various sensors, e.g., sensors 110 and 112, and/or human monitors 114. The annotation device 204 adds the external data to the performance related data through annotations such as metadata, tags, or other forms of annotation indicia such that the annotated performance related data has a layer of extra information, e.g., the external data, in addition to the performance related data. In one implementation, the annotation device 204 automatically adds the external data to the performance related data. In another implementation, the annotation device 204 allows a user to manually input the annotations, e.g., to recorded performances or during a live performance. The annotation device 204 then provides the annotated performance related data to a performance library 206, i.e., a database of annotated performance related data.

The artificial intelligence system 202 receives the annotated performance related data from the performance library 206 and learns to mimic the human decisions of the human performer or human puppeteer. For example, the artificial intelligence system 202 can review thousands of different performances of the same comedic show. Based on different external data, the artificial intelligence system 202 can learn the manner in which the human comedian or human puppeteer adjusted the performance of the same comedy show. For instance, the artificial intelligence system 202 can learn that a particular follow up joke was more receptive to audiences from a particular geographic region than another geographic region based upon external data of geographic information and laughter of various performances of the same comedy show. The artificial intelligence system 202 can then use that learned behavior to provide commands to a performance device during a performance that is controlled by the artificial intelligence system 202.

In one implementation, the artificial intelligence system 202 receives tagged video and/or audio recordings of the performances. For example, each frame of a video may be tagged according to a particular joke. For instance, the first ten frames of a recording may have a tag for a first joke whereas the second ten frames of the recording may have a tag indicating a response to the first joke, e.g., a tag that describes audience laughter. The artificial intelligence system 202 then analyzes the tags for the different performances. The tags can also include external data that is sensed, e.g., room temperature, through sensors 110 and 112. The tags can also include a verbal transcription of an audience member's response with or without additional metadata inferred from the transcription, such as sentiment or whether the audience member was asking a question, or making a comment, etc. The verbal transcription can be provided manually, or automatically, for example, using a speech recognition system.

In another implementation, the artificial intelligence system 202 performs video analysis and/or audio analysis on the video and/or audio recordings of the performances. For example, the artificial intelligence system 202 can perform frame by frame image analysis of a video to determine if audience members smiled as a result of a joke being told. The artificial intelligence system 202 can also perform audio analysis to determine the type of noise that resulted after a joke was told, e.g., laughter, booing, speech recognition, etc.

In yet another implementation, the artificial intelligence system 202 performs an analysis of metadata such as tags in addition to a video and/or audio analysis. Therefore, the artificial intelligence system 202 can corroborate a tag or corroborate its own video and/or audio analysis.

The annotated performance related data may be stored in a database. Alternatively, the annotated performance related data may be interleaved with a data stream for a recorded performance, i.e., video, audio, etc.

FIG. 3 illustrates an artificial intelligence performance configuration 300. The artificial intelligence performance configuration 300 has an artificial intelligence system 202, a data storage device 303, and a performance device 302, e.g., an animatronic device, a playback device, a lighting device, etc.

The data storage device 303 stores a rules engine 304 and a script engine 305. The script engine 305 provides a particular script for the performance, i.e., information about the trajectory of a performance from its introduction to its conclusion. The rules engine 305 generates a plurality of rules for a particular performance, e.g., duration of a performance, physical limitations of a performance arena, etc. The artificial intelligence system 202 generates performance instructions to the performance device 302 based upon the particular script and rules.

Further, the artificial intelligence performance configuration 300 also uses various sensors, e.g., sensors 110 and 112, and human monitors 114, to provide input for live external data. The live external data may include environmental conditions such as lighting, audio, time, number of members in the audience 108, demographic information, and any other conditions that are sensed and are determined to affect how the performance is delivered. Based upon the learning described in FIG. 2 and the received live external data, the artificial intelligence system 202 adjusts the performance instructions to the performance device 302. For instance, the artificial intelligence system 202 may provide an instruction to an animatronic to tell a certain joke based upon the script received from the script engine 302. The artificial intelligence system 202 may then receive live sound data from a sound sensor indicating booing in addition to temperature data from a thermometer indicating a change in temperature, e.g., the performance arena suddenly got warmer. The artificial intelligence system 202 may then instruct the animatronic to tell a follow up joke that the artificial intelligence system 202 learned from the performance library 206 to be receptive to audience members in warmer conditions.

The performance device 302 simply executes the commands provided by the artificial intelligence system 202. In the implementation where the performance device 302 is an animatronic, the performance instructions include gesture commands that are mapped to particular motors, actuators, etc. of the animatronic. The animatronic may be a physical device or a virtual device, e.g., a video screen that displays a computer generated character such as an avatar. In the implementation where the performance device 302 is a playback device, the performance instructions may include particular video and/or audio segments that the artificial intelligence system 202 obtained from the performance library 206 illustrated in FIG. 2 during training and stored for future use during a future performance. Alternatively, the artificial intelligence system 202 may retrieve the video and/or audio segments from the performance library 206 during the live performance controlled by the artificial intelligence system 202.

The performance device 302 may be an animatronic with an integrated playback device. The playback device may playback audio and/or gestures from a previous performance by a human performer or an animatronic performer.

The performance device 302 used by the artificial intelligence system 202 for providing the performance in the artificial intelligence performance configuration 300 may also be the same performance device 302 that was puppeted by a human puppeteer in the recorded performances from which the artificial intelligence system 202 learned in FIG. 2. As a result, a human observer that watches the human puppeted version of the performance and the artificial intelligence controlled version of the performance will view the same performance device 302 and may not be able to tell the difference.

Further, the rules engine 304 is a set of code that provides instructions for following a set of rules. For example, the rules engine 304 may have a rule that ensures that the artificial intelligence system 202 instructs the animatronic to talk with each member of the audience 108. The rules engine 304 is used in parallel with the artificial intelligence system training received by the artificial intelligence system 202 as illustrated in FIGS. 1A and 1B. Therefore, the artificial intelligence system 202 controls the performance device 302 according to both the artificial intelligence system training provided by the artificial intelligence system 202 and the rules engine 304.

In addition, the script engine 305 is a set of code that provides instructions for following a script for the artificial intelligence controlled performance. A scripted performance follows a script with a beginning, middle, and end of the entertainment performance. A successful entertainment performance transitions from beginning to end on time and achieves certain goals, e.g., conveying specific information, generating a certain number of laugh points, etc. The script engine 305 models an entertainment performance as a series of information states selected from a number of possible information states. Each state represents a point where either the performance device 302 or the audience 108 performed a behavior, e.g., verbally, through a gesture, etc. The state may also be an environmental scene transition such as a lighting change, sound change, etc. At each information state, the script engine 305 decides the next information state. The script engine 305 provides the various information states to the artificial intelligence system 202. The artificial intelligence system 202 uses the state information received from the script engine 305 and the external data received from various sensors, e.g., sensors 110 and 112, and/or human monitors 114 to transition from a current information state to a next information state in the script. As an example, the script engine 305 sends a script to the artificial intelligence system 202 that includes a first information state about a first topic and a second information state about a second topic. The artificial intelligence system 202 is aware of the sequence of topics that the performance device 302 should discuss, but the artificial intelligence system 202 knows from the audience interaction data and reactions from the current audience 108 that the first topic may be more interesting to the audience 108 than the second topic. Accordingly, the artificial intelligence system 202 allows the performance device 302 to spend extra time on the first topic while curtailing the amount of time that the animatronic device 104 spends on the second topic to transition between information states in the script according to time constraints of the artificial intelligence controlled performance.

In an alternative implementation, the script engine 305 is not used to provide information states to the artificial intelligence system 202. The artificial intelligence system 202 can learn the information states according to the training the artificial intelligence system 202 receives in FIGS. 1A and 1B with the use of example data.

Figure 3A:
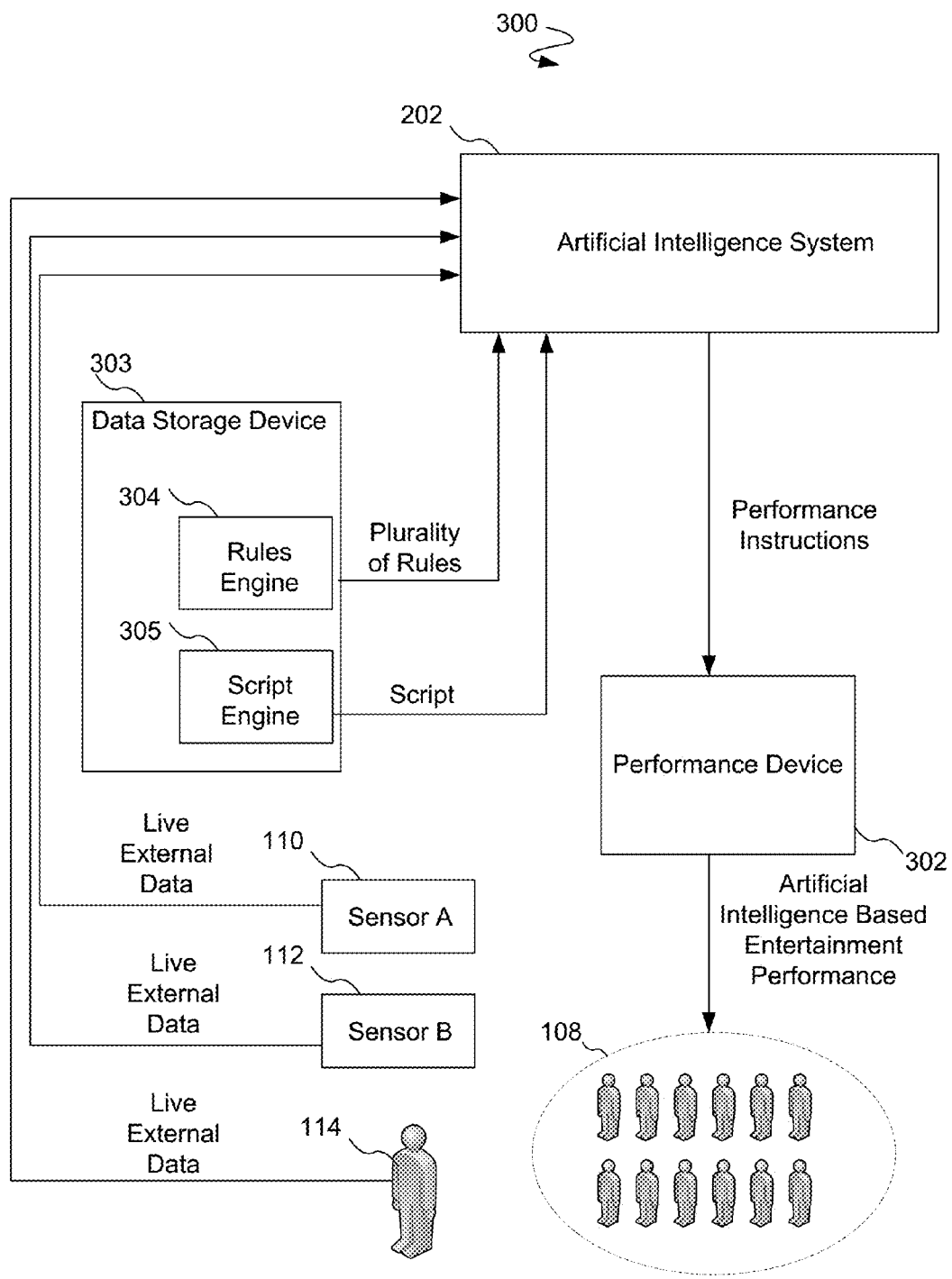
FIG. 3A illustrates an artificial intelligence performance configuration.
Figure 3B:
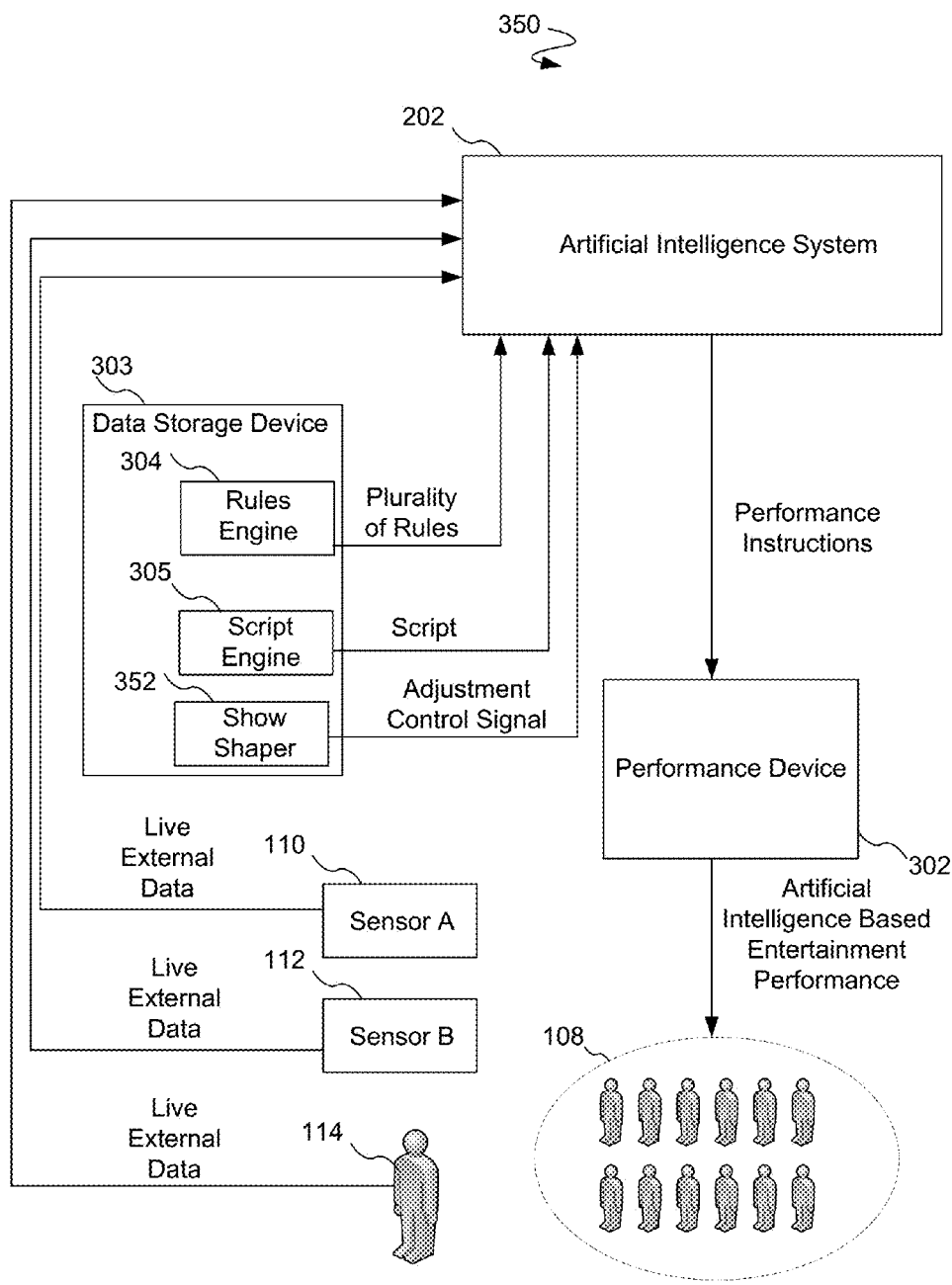
FIG. 3B illustrates an alternative artificial intelligence performance configuration.

FIG. 3B illustrates an alternative artificial intelligence performance configuration 350. The alternative artificial intelligence performance configuration 350 uses a show shaper 352 to send an adjustment control signal to the artificial intelligence system 202. The show shaper 352 is a set of code that is stored on the storage device 303. The show shaper 352 is used by the artificial intelligence system 202 to dynamically adjust the performance. The show shaper 352 may be manually generated and based upon logic from the rules engine 304. Alternatively, the show shaper 352 may operate independently of the rules engine 304 and have logic that is derived from training via observing a show operator or director providing control of a performance.

The configurations illustrated in FIGS. 3A and 3B can provide a performance that is entirely based upon training. In other words, the rules engine 304 and the script engine 305 can be trained in addition to the artificial intelligence system 202. The rules engine 304 and the script engine 305 then can provide automated supervision and structure to the artificial intelligence system 202 for controlling the performance device 302.

Figure 4:
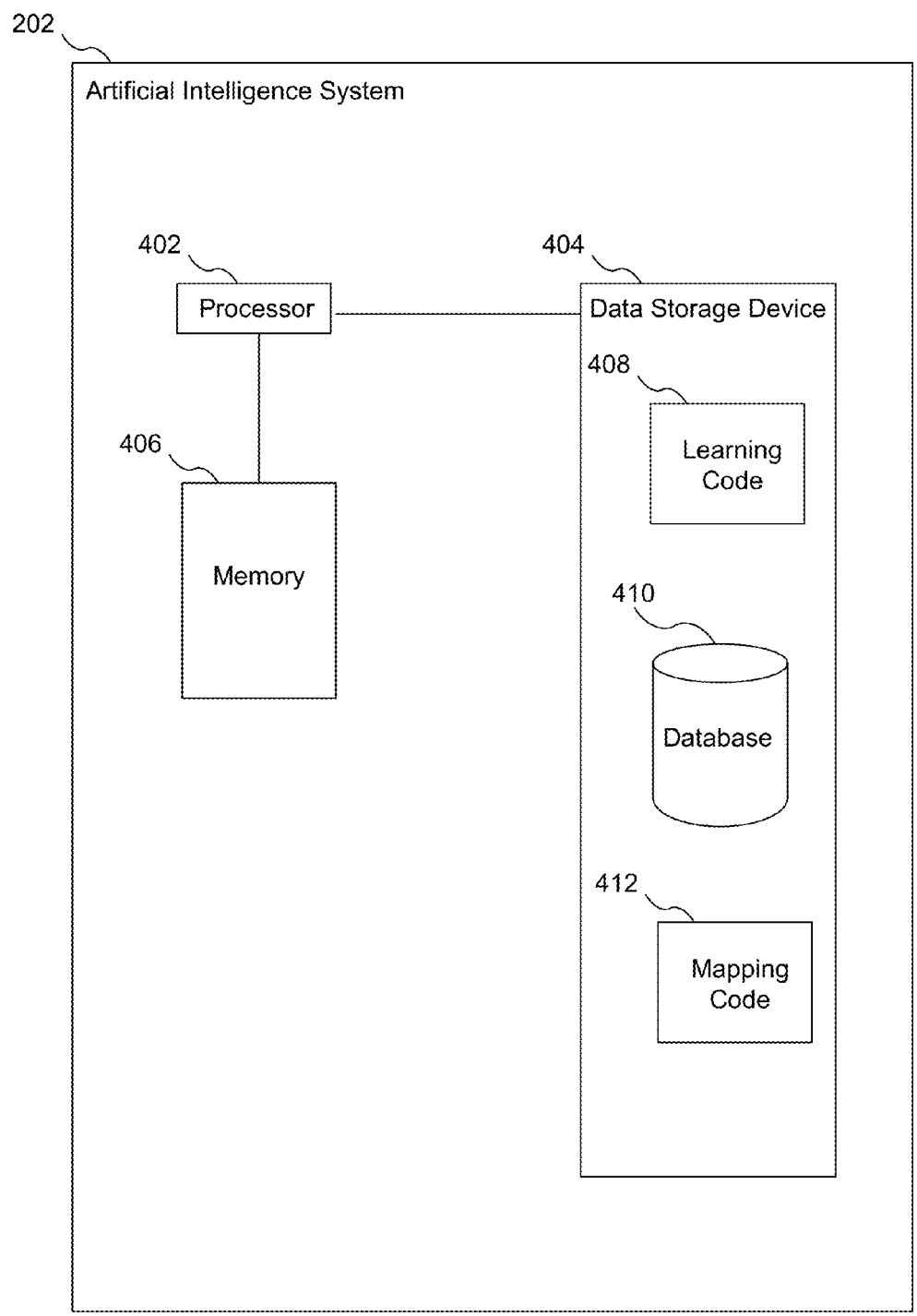
FIG. 4 illustrates the internal components of the artificial intelligence system illustrated in FIGS. 2 and 3.

FIG. 4 illustrates the internal components of the artificial intelligence system 202 illustrated in FIGS. 2 and 3. The artificial intelligence system 202 includes a processor 402, a data storage device 404, and a memory 406. The data storage device 404 stores learning code 408, a database 410, and mapping code 412. The learning code 408 comprises instructions for artificial intelligence system training that mimics actions from previous performances. The database 410 comprises historical data such as previous performances either received and stored during artificial intelligence system training or received during a real time performance from the performance library 206. The mapping code 412 is used by the processor 402 to map particular code instructions, e.g., gesture commands such as animatronic movement of an arm, to physical device control instructions, e.g., activate particular motors in the animatronic to effectuate the movement.

The actuator movements of the animatronic may be captured through a motion capture system. The actuator movements are stored in the performance library 206 illustrated in FIG. 2. The mapping code 412 is then used by the processor 402 to map a particular information state, i.e., a current state of sensed information, to a corresponding action indicated by one or more actuator movements stored in the performance library 206. The action may contain prerecorded performance instructions. Alternatively, the action may be determined by the artificial intelligence system 202 according to its training as illustrated in FIG. 2 based upon combining or removing certain previous behavior from the prerecorded performance instructions.

The processor 402 generates the learning code 408 based upon the learning phase described for FIG. 2. The artificial intelligence system 202 comprises a neural network or other complex computing system that is capable of generating performance instructions based upon the learning code 408, rules received from the rules engine 304 illustrated in FIG. 3, and external data in real time. Further, the artificial intelligence system 202 uses audience and environmental sensing to select which verbal and non-verbal behaviors will be chosen from the database 410 to perform next. Other types of data, e.g., where the audience 108 attention is being placed, emotional reactions, lack of attention, talking during the artificial intelligence controlled performance, etc., may also be sensed, e.g., through sensors or manual input, and used by the artificial intelligence system 202 to generate performance instructions. Therefore, the artificial intelligence system 202 uses previous audience interaction data and/or sensed live audience information to provide performance instructions to the performance device 302 illustrated in FIG. 3.

Although the training of the artificial intelligence system 202 illustrated in FIGS. 2, 3A, 3B, and 4 and the performance provided by the artificial intelligence system 202 are described as distinct phases, overlap of the training and the performance is possible. For instance, a portion of a previously recorded performance may be used not only to train the artificial intelligence system 202, but also for playback purposes by the artificial intelligence system 202 during a live performance. As an example, the artificial intelligence system 202 may generate new performance instructions for an animatronic to perform during a portion of a live performance and may provide performance instructions based on playback of a previously recorded performance. The artificial intelligence system 202 can even provide playback commands of previously recorded performances to a performance device 102 for an entire performance. The artificial intelligence system 202 would select portions of previously recorded performances based upon live external data that is received from various sensors 110 and 112 and/or human monitors 114 illustrated in FIG. 3.

Further, the recorded performance related data can be reused to train the artificial intelligence system 202 even after an initial training. For instance, techniques for determining audience reactions, e.g., number of people laughing, may improve such that a computing device can perform such a determination without a manual input. The previously recorded performance related data can then be reanalyze based upon the improved techniques to retrain the artificial intelligence system 202.

Although the configurations illustrated in FIGS. 1-4 describe recording the performance related data, the artificial intelligence system 202 can alternatively be trained with performance related data in real time. For instance, the artificial intelligence system 202 can be operatively configured to monitor live performances and store performance related data for learning purposes.

The processes described herein may be implemented in a general, multi-purpose or special purpose processor, e.g., a graphics processing unit ("GPU"). Such a processor will execute instructions, either at the assembly, compiled or machine-level, to perform the processes. Those instructions can be written by one of ordinary skill in the art following the description herein and stored or transmitted on a computer readable medium. The instructions may also be created using source code or a computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, wearable computer, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
    recording performance related data for a plurality of real-world entertainment performances having a plurality of audiences;
    configuring one or more audience sensors within an entertainment performance environment to sense real-world external data corresponding to one or more measurements of human sensory reception at real-world locations of the plurality of entertainment performances measured in response to the plurality of real-world entertainment performances, the one or more audience sensors being selected from the group consisting: of a thermometer, a sound sensor, and a video recorder, the real-world external data being selected from the group consisting of: gestures, timing, fidgeting, attention, silence, demographics, audience age, geographic location, room size, laughter, applause, booing, groaning, and emotional reaction;
    annotating the performance related data with metadata corresponding to the real-world external data;
    providing a plurality of rules based on the metadata to an artificial intelligence system, the plurality of rules comprising one or more conditions associated with the real-world external data of the real-world performance measured at the real-world locations within the entertainment performance environment;
    training the artificial intelligence system to modify a selection of content for the real-world performance based upon the one or more conditions being met;
    generating, at the artificial intelligence system, performance instructions to provide the real-world performance, the performance instructions being based on the training; and
    providing, from the artificial intelligence system to a performance device, the performance instructions to provide the real-world performance.

2. The method of claim 1, further comprising receiving, at the artificial intelligence system, the real-world external data and modifying, at the artificial intelligence system, the performance instructions based upon the real-world external data.

3. The method of claim 1, wherein the performance instructions comprise mapping instructions that map code instructions to a device in the performance device that performs an operation.

4. The method of claim 1, further comprising providing a script to the artificial based intelligence system such that the performance instructions are also based upon the script.

5. The method of claim 1, further comprising adjusting a portion of the performance instructions based upon a show shaper instruction.

6. A system comprising:
    a recording device that records performance related data for a plurality of real-world entertainment performances having a plurality of audiences;
    one or more audience sensors configured to sense real-world external data within an entertainment performance environment, the real-world external data corresponding to one or more measurements of human sensory reception at real-world locations of the plurality of entertainment performances measured in response to the plurality of real-world entertainment performances, the one or more audience sensors being selected from the group consisting of: a thermometer, a sound sensor, and a video recorder, the real-world external data being selected from the group consisting of: gestures, timing, fidgeting, attention, silence, demographics, audience age, geographic location, room size, laughter, applause, booing, groaning, and emotional reaction;
    an annotation device that annotates the performance related data with metadata corresponding to the real-world external data; and
    an artificial intelligence system that is trained to modify a selection of content for the real-world performance based on one or more conditions being met, that generates performance instructions to provide a real-world performance, and that provides the performance instructions to a performance device to provide the real-world performance, the one or more conditions being determined according to a plurality of rules based on the metadata, the one or more conditions being associated with the real-world external data of the real-world performance measured at the real-world locations within the performance environment, the performance instructions being based on the training.

7. The system of claim 6, further comprising a plurality of real-world sensors that provide the real-world external data to the artificial intelligence system so that the artificial intelligence system modifies the performance instructions based upon the real-world external data.

8. The system of claim 6, wherein the performance device is an animatronic.

9. The system of claim 6, wherein the performance device is a playback device.

10. The system of claim 6, further comprising a rules engine that provides the plurality of rules to the artificial based intelligence system.

11. The system of claim 6, further comprising a script engine that provides a script to the artificial based intelligence system such that the performance instructions are also based upon the script.

12. A computer program product comprising a computer readable storage device having a computer readable program stored thereon, wherein the computer readable program while executing on a computer causes the computer to:
record performance related data for a plurality of real-world entertainment performances having a plurality of audiences;
configure one or more audience sensors within an entertainment performance environment to sense real-world external data corresponding to one or more measurements of human sensory reception at locations of the plurality of real-world entertainment performances measured in response to the plurality of real-world entertainment performances, the one or more audience sensors being selected from the group consisting: of a thermometer, a sound sensor, and a video recorder, the real-world external data being selected from the group consisting of: gestures, timing, fidgeting, attention, silence, demographics, audience age, geographic location, room size, laughter, applause, booing, groaning, and emotional reaction;
annotate the performance related data with metadata corresponding to the real-world external data;
provide a plurality of rules based on the metadata to an artificial intelligence system, the plurality of rules comprising one or more conditions associated with the real-world external data of the real-world performance measured at the real-world locations within the performance environment;
train the artificial intelligence system to modify a selection of content for the real-world performance based upon the one or more conditions being met;
generate, at the artificial intelligence system, performance instructions to provide the real-world performance, the performance instructions being based on the training; and
provide, from the artificial intelligence system to a performance device, the performance instructions to provide the real-world performance.

13. The computer program product of claim 12, wherein the computer is further caused to receive, at the artificial intelligence system, the real-world external data and modify, at the artificial intelligence system, the performance instructions based upon the external data.

14. The computer program product of claim 12, wherein the performance instructions comprise mapping instructions that map code instructions to a device in the performance device that performs an operation.

15. The computer program product of claim 12, further comprising providing a script to the artificial based intelligence system such that the performance instructions are also based upon the script.

* * * * *